(12) United States Patent
Imoto et al.

(10) Patent No.: US 6,358,647 B1
(45) Date of Patent: Mar. 19, 2002

(54) HYDROGEN ABSORBING ALLOY ELECTRODE, METHOD OF FABRICATING HYDROGEN ABSORBING ALLOY ELECTRODE, AND ALKALI SECONDARY BATTERY

(75) Inventors: Teruhiko Imoto; Kikuko Kato, both of Katano; Yasushi Kuroda, Tokushima; Nobuyuki Higashiyama, Mino; Mamoru Kimoto, Hirakata; Shin Fujitani, Hirakata; Koji Nishio, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/374,998

(22) Filed: Aug. 16, 1999

Related U.S. Application Data

(62) Division of application No. 08/978,271, filed on Nov. 25, 1997, now Pat. No. 5,985,057.

(30) Foreign Application Priority Data

Nov. 29, 1996 (JP) ............................................ 8-318422
Nov. 29, 1996 (JP) ............................................ 8-318423

(51) Int. Cl.$^7$ ............................ H01M 4/38; H01M 4/46
(52) U.S. Cl. ................... 429/218.1; 429/206; 420/900
(58) Field of Search ................ 429/218.2, 59, 429/206; 420/900

(56) References Cited

U.S. PATENT DOCUMENTS

| | | | | |
|---|---|---|---|---|
| 5,393,616 A | * | 2/1995 | Mori et al. | 429/59 |
| 5,837,317 A | * | 11/1998 | Moriwaki et al. | 427/217 |
| 5,935,732 A | * | 8/1999 | Matsumura et al. | 429/218.2 |
| 5,943,545 A | * | 8/1999 | Ise | 419/31 |

* cited by examiner

*Primary Examiner*—Carol Chaney
(74) *Attorney, Agent, or Firm*—Armstrong, Westerman & Hattori, LLP

(57) ABSTRACT

In the present invention, a hydrogen absorbing alloy containing at least nickel, cobalt and aluminum, in which the sum a of the respective abundance ratios of cobalt atoms and aluminum atoms in a portion to a depth of 30 Å from its surface and the sum b of the respective abundance ratios of cobalt atoms and aluminum atoms in a bulk region inside thereof satisfy conditions of $a/b \geq 1.30$, or a hydrogen absorbing alloy containing at least nickel, cobalt, aluminum and manganese, in which the sum A of the respective abundance ratios of cobalt atoms, aluminum atoms and manganese atoms in a portion to a depth of 30 Å from its surface and the sum B of the respective abundance ratios of cobalt atoms, aluminum atoms and manganese atoms in a bulk region inside thereof satisfy conditions $A/B \geq 1.20$ is used for a hydrogen absorbing alloy electrode in an alkali secondary battery.

4 Claims, 1 Drawing Sheet

HYDROGEN ABSORBING ALLOY ELECTRODE, METHOD OF FABRICATING HYDROGEN ABSORBING ALLOY ELECTRODE, AND ALKALI SECONDARY BATTERY

This application is a division of prior application Ser. No. 08/978,271 filed Nov. 25, 1997, now U.S. Pat. No. 5,985,057.

BACKGROUND OF THE INVENTION

1. Field of the Invention

The present invention relates to a hydrogen absorbing alloy electrode used as a negative electrode of an alkali secondary battery such as a nickel-hydrogen secondary battery, a method of fabricating the hydrogen absorbing alloy electrode, and an alkali secondary battery using the hydrogen absorbing alloy electrode, and is characterized in that a hydrogen absorbing alloy used for the hydrogen absorbing alloy electrode is modified, to improve the activity in the early stages of the hydrogen absorbing alloy electrode and the characteristics thereof at low temperature.

2. Description of the Related Art

A nickel-hydrogen secondary battery has been conventionally known as one example of an alkali secondary battery. In the nickel-hydrogen secondary battery, a hydrogen absorbing alloy electrode using a hydrogen absorbing alloy has been generally used as its negative electrode.

Examples of the hydrogen absorbing alloy used for the negative electrode include a hydrogen absorbing alloy having a $CaCu_5$-type crystal structure using Misch metal (Mm) which is a mixture of rare earth elements or a Laves type hydrogen absorbing alloy.

In each of the hydrogen absorbing alloys, however, a coating of an oxide or the like is generally formed on its surface by natural oxidation, for example. When a hydrogen absorbing alloy electrode is fabricated using such a hydrogen absorbing alloy, and the hydrogen absorbing alloy electrode is used as a negative electrode of the nickel-hydrogen secondary battery, the activity in the early stages of the hydrogen absorbing alloy is low, and hydrogen gas is not sufficiently absorbed in the hydrogen absorbing alloy. As a result, some problems arise. For example, the capacity in the early stages of the nickel-hydrogen secondary battery is decreased, and the internal pressure of the battery is increased by the hydrogen gas.

Therefore, in recent years, a method of immersing a hydrogen absorbing alloy in an acid solution such as hydrochloric acid, to remove a coating of an oxide on the surface of the hydrogen absorbing alloy has been proposed, as disclosed in Japanese Patent Laid-Open No. 225975/1993.

When the hydrogen absorbing alloy is thus immersed in the acid solution, to remove the coating of the oxide on the surface of the hydrogen absorbing alloy, some active portions appear on the surface of the hydrogen absorbing alloy.

However, the active portions thus appearing on the surface are oxidized again, whereby the activity in the early stages of the hydrogen absorbing alloy is not sufficiently improved, and the hydrogen gas is not sufficiently absorbed in the hydrogen absorbing alloy in the early stages. As a result, some problems still exist. For example, the capacity in the early stages of the battery is low, and the internal pressure of the battery is increased.

Furthermore, in the hydrogen absorbing alloy electrode using the conventional hydrogen absorbing alloy, the electrochemical catalytic capability thereof is not sufficient, resulting in inferior discharge characteristics in a case where it is used under low temperature.

SUMMARY OF THE INVENTION

An object of the present invention is to improve, in a hydrogen absorbing alloy electrode used as a negative electrode of an alkali secondary battery such as a nickel-hydrogen secondary battery, the activity in the early stages of the hydrogen absorbing alloy electrode which is used as the negative electrode.

Another object of the present invention is to simply obtain a hydrogen absorbing alloy electrode whose activity in the early stages is improved, resulting in increased charging and discharging characteristics.

Still another object of the present invention is to improve, in an alkali secondary battery using a hydrogen absorbing alloy electrode as its negative electrode, the discharge capacity thereof in the early stages and prevent the internal pressure of the battery from being increased.

A further object of the present invention is to obtain, in an alkali secondary battery using a hydrogen absorbing alloy electrode as its negative electrode, sufficient discharge characteristics even in a case where the battery is used under low temperature.

In a first hydrogen absorbing alloy electrode according to the present invention, a hydrogen absorbing alloy containing at least nickel, cobalt and aluminum is used. Letting a be the sum of the respective abundance ratios of cobalt atoms and aluminum atoms in a portion to a depth of 30 Å from the surface of the hydrogen absorbing alloy, and b be the sum of the respective abundance ratios of cobalt atoms and aluminum atoms in a bulk region inside the hydrogen absorbing alloy, conditions of $a/b \geq 1.30$ are satisfied.

As in the first hydrogen absorbing alloy electrode, when more cobalt atoms and aluminum atoms exist on the surface of the hydrogen absorbing alloy, as compared with those in the bulk region inside the hydrogen absorbing alloy, the catalytic actions of the cobalt atoms and the aluminum atoms cause the activity of the hydrogen absorbing alloy electrode using the hydrogen absorbing alloy to be improved from the early stages and cause the electron conductivity thereof under low temperature to be improved.

When the first hydrogen absorbing alloy electrode is used as a negative electrode of an alkali secondary battery such as a nickel-hydrogen secondary battery, the emission of hydrogen gas in the early stages is restrained, so that the capacity in the early stages of the battery is increased, and the internal pressure of the battery is prevented from being increased. Further, the electrochemical catalytic capability of the hydrogen absorbing alloy electrode is improved.

In a second hydrogen absorbing alloy electrode according to the present invention, a hydrogen absorbing alloy containing at least nickel, cobalt, aluminum and manganese is used. Letting A be the sum of the respective abundance ratios of cobalt atoms, aluminum atoms and manganese atoms in a portion to a depth of 30 Å from the surface of the hydrogen absorbing alloy, and B be the sum of the respective abundance ratios of cobalt atoms, aluminum atoms and manganese atoms in a bulk region inside the hydrogen absorbing alloy, conditions of $A/B \geq 1.20$ are satisfied.

As in the second hydrogen absorbing alloy electrode, when more cobalt atoms, aluminum atoms and manganese atoms exist on the surface of the hydrogen absorbing alloy, as compared with those in the bulk region inside the hydrogen absorbing alloy, the catalytic actions of the cobalt atoms, the aluminum atoms and the manganese atoms cause the activity of the hydrogen absorbing alloy electrode using the hydrogen absorbing alloy to be improved from the early stages and cause the electrochemical catalytic capability thereof to be improved.

When the second hydrogen absorbing alloy electrode is used as a negative electrode of an alkali secondary battery such as a nickel-hydrogen secondary battery, the emission of hydrogen gas in the early stages is restrained, so that the capacity in the early stages of the battery is increased, and the internal pressure of the battery is prevented from being increased. Further, the discharge characteristics in a case where the battery is used under low temperature are also improved.

In a first method of fabricating a hydrogen absorbing alloy electrode according to the present invention, in fabricating a hydrogen absorbing alloy electrode using a hydrogen absorbing alloy containing at least nickel, cobalt and aluminum, the hydrogen absorbing alloy is surface-treated in an acid solution to which 1 to 5% by weight of a cobalt compound and an aluminum compound per the weight of the hydrogen absorbing alloy are respectively added.

When the hydrogen absorbing alloy containing nickel, cobalt and aluminum is thus surface-treated in the acid solution to which the cobalt compound and the aluminum compound are added, active portions appear on the surface of the hydrogen absorbing alloy, and the active portions are protected by a protective film composed of $CoAl_2O_4$. Therefore, the active portions are prevented from being oxidized again, and the respective numbers of the cobalt atoms and the aluminum atoms on the surface of the hydrogen absorbing alloy are larger than those in the bulk region inside the hydrogen absorbing alloy.

When the amounts of cobalt compound and the aluminum compound which are added to the acid solution are respectively set in the range of 1 to 5% by weight per the weight of the hydrogen absorbing alloy, the above-mentioned first hydrogen absorbing alloy electrode in which the relationship between the sum a of the respective abundance ratios of cobalt atoms and aluminum atoms in the portion to a depth of 30 Å from the surface of the hydrogen absorbing alloy and the sum b of the respective abundance ratios of cobalt atoms and aluminum atoms in the bulk region inside the hydrogen absorbing alloy satisfies conditions of $a/b \geq 1.30$ is obtained.

When the respective amounts of the cobalt compound and the aluminum compound which are added to the acid solution are less than the above-mentioned range, the respective numbers of the cobalt atoms and the aluminum atoms in the portion to a depth of 30 Å from the surface of the hydrogen absorbing alloy are decreased. On the other hand, if the respective amounts of the cobalt compound and the aluminum compound are too large, the cobalt atoms and the aluminum atoms do not remain on the surface of the hydrogen absorbing alloy. In either one of the cases, the hydrogen absorbing alloy electrode satisfying the conditions of $a/b \geq 1.30$ is not obtained.

As the cobalt compound and the aluminum compound which are added to the acid solution, any compounds which can be dissolved in the acid solution may be used. Examples of the cobalt compound include cobalt chloride and cobalt hydroxide (including cobalt oxyhydroxide). Examples of the aluminum compound include aluminum chloride and aluminum hydroxide.

In a second method of fabricating a hydrogen absorbing alloy electrode according to the present invention, in fabricating a hydrogen absorbing alloy electrode using a hydrogen absorbing alloy containing at least nickel, cobalt, aluminum and manganese, the hydrogen absorbing alloy is surface-treated in an acid solution to which 1 to 5% by weight of an aluminum compound per the weight of the hydrogen absorbing alloy is added.

When the hydrogen absorbing alloy containing nickel, cobalt, aluminum and manganese is thus surface-treated in the acid solution to which the aluminum compound is added, the respective numbers of the cobalt atoms and the aluminum atoms on the surface of the hydrogen absorbing alloy are larger than those in the bulk region inside the hydrogen absorbing alloy.

When the amount of the aluminum compound added to the acid solution is set in the range of 1 to 5% by weight per the weight of the hydrogen absorbing alloy, the above-mentioned second hydrogen absorbing alloy electrode in which the relationship between the sum A of the respective abundance ratios of cobalt atoms, aluminum atoms and manganese atoms in the portion to a depth of 30 Å from the surface of the hydrogen absorbing alloy and the sum B of the respective abundance ratios of cobalt atoms, aluminum atoms and the manganese atoms in the bulk region inside the hydrogen absorbing alloy satisfies conditions of $A/B \geq 1.20$ is obtained.

When the amount of the aluminum compound added to the acid solution is less than the above-mentioned range, the respective numbers of the cobalt atoms, the aluminum atoms and the manganese atoms in the portion to a depth of 30 Å from the surface of the hydrogen absorbing alloy are decreased. On the other hand, if the amount of the aluminum compound is too large, the cobalt atoms, the aluminum atoms and the manganese atoms do not remain on the surface of the hydrogen absorbing alloy. In either one of the cases, the hydrogen absorbing alloy electrode satisfying the conditions of $A/B \geq 1.20$ and $a/b \geq 1.3$ is not obtained.

In each of the first and second methods of fabricating the hydrogen absorbing alloy electrode, if the pH of the acid solution is too high, a coating of an oxide or the like on the surface of the hydrogen absorbing alloy cannot be sufficiently removed. On the other hand, if the pH of the acid solution is too low, an active metal in the hydrogen absorbing alloy is dissolved, so that the number of active portions on the surface of the hydrogen absorbing alloy is decreased. Therefore, the initial pH of the acid solution is set preferably in the range of 0.7 to 2.0.

When the temperature of the acid solution is too high, the active metal in the hydrogen absorbing alloy is also dissolved, so that the number of the active portions on the surface of the hydrogen absorbing alloy is decreased. On the other hand, if the temperature of the acid solution is too low, the coating of the oxide or the like on the surface of the hydrogen absorbing alloy cannot be sufficiently removed. Therefore, the temperature of the acid solution is set preferably in the range of 20° C. to 70° C.

Furthermore, in treating the hydrogen absorbing alloy in the acid solution as described above, it is preferable that a quinone compound such as anthrahydroquinone is added to the acid solution. When the quinone compound is thus added to the acid solution, dissolved oxygen in the acid solution is removed, so that the active portions appearing on the surface of the hydrogen absorbing alloy are prevented from being oxidized again, and the activity in the early stages of the hydrogen absorbing alloy is further improved. The amount of the quinone compound added to the acid solution is preferably 5 ppm to 100 ppm.

The hydrogen absorbing alloy having a CaCu$_5$-type crystal structure used in the present invention is represented by a general formula MmNi$_a$Co$_b$Al$_c$Mn$_d$. In the formula, Mm is a mixture of rare earth elements selected from La, Ce, Pr, Nd, Sm, Eu, Sc, Y, Pm, Gd, Tb, Gy, Ho, Er, Tm, Yb and Lu. Particularly, Mm mainly composed of a mixture of La, Ce, Pr, Nd and Sm is preferable. Further, a>0, b>0, c>0, and d≧0, and 4.4≦a+b+c+d≦5.4.

The hydrogen absorbing alloy composed of the above-mentioned composition can satisfy the basic performance such as cycle characteristics and discharge characteristics of the alkali secondary battery. Further, elements Si, C, W and B may be added in the range in which the properties of absorbing hydrogen in the hydrogen absorbing alloy are not changed.

In the above-mentioned composition formula, it is preferable that the amount a of nickel is 2.8≦a≦5.2, the amount b of cobalt is 0<b≦1.4, the amount c of aluminum is 0<c≦1.2, and the amount d of manganese is d≦1.2. Further, in order to increase the capacity of the battery, it is preferable that the amount c of aluminum is c≦1.0, and the amount d of manganese is d≦1.0.

There and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
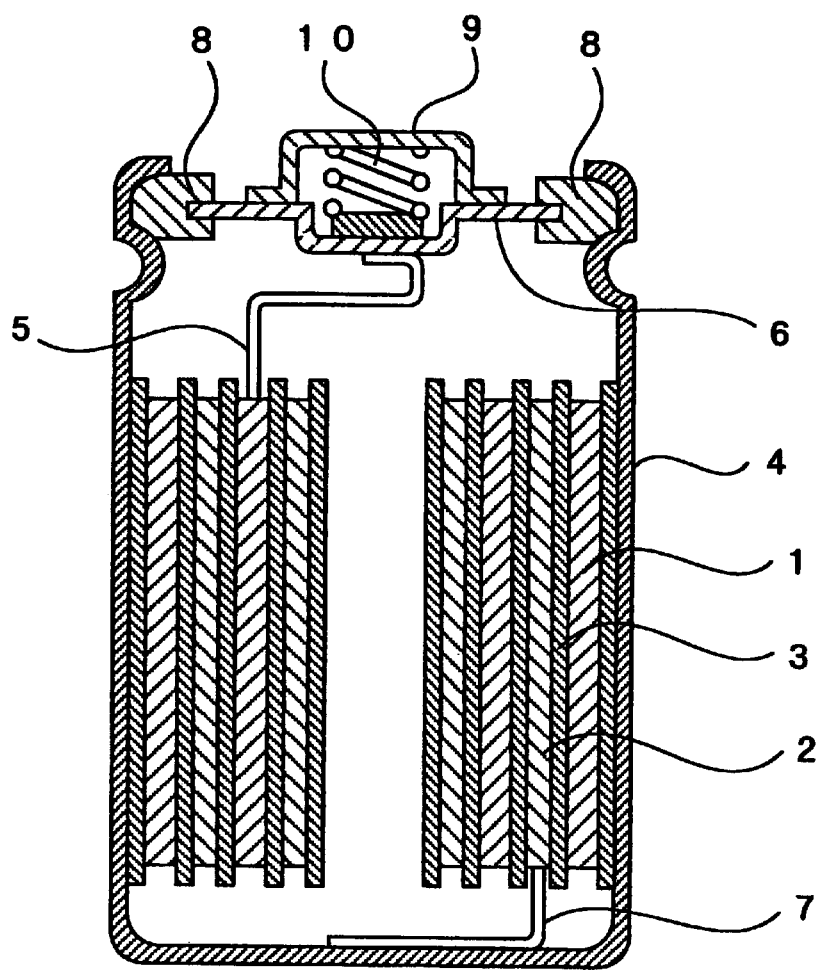
FIG. 1 is a schematic sectional view of a nickel-hydrogen secondary battery fabricated in embodiments and comparative examples of the present invention.

A hydrogen absorbing alloy electrode, a method of fabricating the hydrogen absorbing alloy electrode, and an alkali secondary battery according to embodiments of the present invention will be specifically described, and comparative examples will be taken, to make it clear that in an alkali secondary battery using a hydrogen absorbing alloy electrode in the present embodiments as its negative electrode, the internal pressure in the early stages of the battery is prevented from being increased, and the discharge characteristics thereof under low temperature are improved. The hydrogen absorbing alloy electrode, the method of fabricating the hydrogen absorbing alloy electrode, and the alkali secondary battery in the present invention are not particularly limited to those in the following embodiments, and can be embodied upon being suitably changed in the range in which the gist thereof is not changed.

(Embodiments 1 to 3 and Comparative Examples 1 to 3)

In the embodiments 1 to 3 and the comparative examples 1 to 3, Misch metal (Mm) which is a mixture of rare earth elements, Ni, Co, Al and Mn were so weighed and mixed as to have a composition of MmNi$_{3.1}$Co$_{0.8}$Al$_{0.4}$Mn$_{0.7}$, were fussed and alloyed, and were then mechanically ground, to obtain hydrogen absorbing allow powder.

The surface of the hydrogen absorbing alloy powder thus obtained was treated in an acid solution using hydrochloric acid.

In thus treating the surface of the hydrogen absorbing alloy powder in the acid solution, the initial pH of the acid solution was set to 1.0, and the liquid temperature thereof was set to 25° C., as shown in the following Table 1. Further, in the embodiments 1 to 3 and the comparative example 1, aluminum chloride (AlCl$_3$) and cobalt chloride (CoCl$_2$) were respectively added as an aluminum compound and a cobalt compound to the acid solution in proportions shown in the same table, and 50 ppm of anthraquinone was added. In the comparative example 2, 50 ppm of only anthraquinone was added. In the comparative example 3, none of aluminum chloride, cobalt chloride and anthraquinone was added.

A hydrogen absorbing alloy was immersed in each of the acid solutions adjusted in the above-mentioned manner until the pH thereof would be 7.0, to treat the surface of the hydrogen absorbing alloy.

The abundance ratio of each type of atoms in a portion to a depth of 30 Å from the surface of each of the hydrogen absorbing alloys surface-treated in the above-mentioned manner was then measured. The abundance ratio of the atoms was measured using a scanning transmission electron micro scope and a transmission electron micro scope and by an energy dispersion type X-ray analysis method. The abundance ratio of the atoms means the ratio of the number of the atoms to the total number of all metallic atoms detected by the energy dispersion type X-ray analysis method.

By this method, the sum a of the respective abundance ratios of Co atoms and Al atoms in the portion to a depth of 30 Å from the surface of each of the hydrogen absorbing alloys was found, and the sum b of the respective abundance ratios of Co atoms and Al atoms in a bulk region inside the hydrogen absorbing alloy was similarly found, to calculate a/b. The results thereof were together shown in the following Table 1.

TABLE 1

|  | embodiment | | | comparative example | | |
|---|---|---|---|---|---|---|
|  | 1 | 2 | 3 | 1 | 2 | 3 |
| treating conditions of acid solution | | | | | | |
| pH | 1.0 | 1.0 | 1.0 | 1.0 | 1.0 | 1.0 |
| liquid temperature (° C.) | 25 | 25 | 25 | 25 | 25 | 25 |
| AlCl$_3$ (% by weight) | 1 | 3 | 5 | 7 | 0 | 0 |
| CoCl$_2$ (% by weight) | 1 | 3 | 5 | 7 | 0 | 0 |
| anthraquinone (ppm) | 50 | 50 | 50 | 50 | 50 | 0 |
| abundance ratio of atoms on surface | | | | | | |
| Co (atm/%) | 19.45 | 21.22 | 22.34 | 19.45 | 15.56 | 15.56 |
| Al (atm/%) | 2.89 | 3.04 | 3.34 | 2.34 | 1.20 | 1.20 |
| a (atm/%) | 22.34 | 24.26 | 25.68 | 21.79 | 16.76 | 16.76 |
| abundance ratio of atoms inside | | | | | | |
| b (atm/%) | 17.21 | 17.76 | 18.02 | 17.82 | 17.01 | 17.01 |
| a/b | 1.30 | 1.37 | 1.43 | 1.22 | 0.99 | 0.99 |

As a result, in the hydrogen absorbing alloys in the embodiments 1 to 3, the value of a/b was not less than 1.30, which satisfied the conditions of the present invention. On the other hand, in the hydrogen absorbing alloy in the comparative example 1 which was treated using an acid solution to which 7% by weight, which is more than 5% by weight, of AlCl$_3$ and CoCl$_2$ were added, and the hydrogen absorbing alloy in each of the comparative examples 2 and 3 which was treated using an acid solution to which no AlCl$_3$ and CoCl$_2$ were added, the value of a/b was less than 1.30.

20 parts by weight of a 5% solution of polyethylene oxide which is a binder was then added and mixed with 100 parts by weight of each of the hydrogen absorbing alloys surface-treated as shown in the embodiments 1 to 3 and the comparative examples 1 and 2, and paste was prepared, was applied to both surfaces of a conductive substrate composed of a punched metal nickel-plated and was dried at room temperature, and was then cut to predetermined lengths, to fabricate each of hydrogen absorbing alloy electrodes in the embodiments 1 to 3 and the comparative examples 1 and 2.

Each of the hydrogen absorbing alloy electrodes thus fabricated was used as a negative electrode, while a sintered type nickel electrode conventionally used was used as a positive electrode. Further, a non-woven fabric having alkali resistance was used as a separator.

As shown in FIG. 1, a separator 3 was interposed between the positive electrode 1 and each of the negative electrodes 2, and they were contained in a battery can 4 upon being spirally wound, after which 30% by weight of a potassium hydroxide solution was pored as an alkali electrolyte into the battery can 4, the battery can 4 was sealed, the positive electrode 1 was connected to a positive electrode cover 6 through a positive electrode lead 5, and the negative electrode 2 was connected to the battery can 4 through a negative electrode lead 7, to electrically separate the battery can 4 and the positive electrode cover 6 by an insulating packing 8.

A coil spring 10 was provided between the positive electrode cover 6 and a positive electrode external terminal 9. When the internal pressure of the battery was abnormally increased, the coil spring 10 was compressed, so that gas inside the battery was discharged into the air.

Each of the above-mentioned nickel-hydrogen secondary batteries was so designed that the discharge capacity thereof would be 1000 mAh at a temperature of 25° C. and at a current of 0.2 C.

Each of the nickel-hydrogen secondary batteries fabricated in the above-mentioned manner was charged at a charging current of 0.2 C for six hours under room temperature (ordinary temperature), and was then discharged at a discharging current of 0.2 C under low temperature of 0° C., to find the initial discharge capacity of the nickel-hydrogen secondary battery. The results thereof were shown in the following Table 2.

TABLE 2

| type of hydrogen absorbing alloy electrode | initial discharge capacity (mAh) |
| --- | --- |
| embodiment 1 | 666 |
| embodiment 2 | 669 |
| embodiment 3 | 687 |
| comparative example 1 | 465 |
| comparative example 2 | 445 |

As apparent from the results, in each of the nickel-hydrogen secondary batteries respectively using as their negative electrodes the hydrogen absorbing alloy electrodes in the embodiments 1 to 3 using the hydrogen absorbing alloys in which the value of a/b was not less than 1.30, the initial discharge capacity thereof in a case where it was used under low temperature of 0° C. was higher, and the discharge characteristics thereof under low temperature are improved, as compared with those in each of the nickel-hydrogen secondary batteries using as their negative electrodes the hydrogen absorbing alloy electrodes in the comparative examples 1 and 2 respectively using the hydrogen absorbing alloys in which the value of a/b was less than 1.30.

(Embodiments 4 to 6 and Comparative Examples 4 to 6)

In the embodiments 4 to 6 and the comparative examples 4 to 6, in surface-treating in an acid solution hydrogen absorbing alloys obtained by grinding in the same manner as described in the embodiments 1 to 3 and the comparative examples 1 to 3, the liquid temperature of the acid solution was set to 25° C., and the amounts of $AlCl_3$, $CoCl_2$ and anthraquinone which were added to the acid solution in the embodiment 4 were made the same as those in the embodiment 1, the amounts in the embodiment 5 were made the same as those in the embodiment 2, the amounts in the embodiment 6 were made the same as those in the embodiment 3, the amounts in the comparative example 4 were made the same as those in the comparative example 1, the amounts in the comparative example 5 were made the same as those in the comparative example 2, and the amounts in the comparative example 6 were made the same as those in the comparative example 3 as shown in the following Table 3, while the initial pH of the acid solution was changed as shown in the same table, to respectively surface-treat the hydrogen absorbing alloys.

Even when the initial pH of the acid solution was changed as described above, the value of a/b was hardly changed, that is, the value in the embodiment 4 was approximately the same as that in the embodiment 1, the value in the embodiment 5 was approximately the same as that in the embodiment 2, the value in the embodiment 6 was approximately the same as that in the embodiment 3, the value in the comparative example 4 was approximately the same as that in the comparative example 1, the value in the comparative example 5 was approximately the same as that in the comparative example 2, and the value in the comparative example 6 was approximately the same as that in the comparative example 3.

Hydrogen absorbing alloy electrodes were then respectively fabricated in the same manner as described in the embodiments 1 to 3 and the comparative examples 1 and 2 using the hydrogen absorbing alloys obtained in the above-mentioned manner, and nickel-hydrogen secondary batteries were respectively fabricated using the hydrogen absorbing alloy electrodes as their negative electrodes.

The internal pressure of each of the nickel-hydrogen secondary batteries thus fabricated was measured while charging the battery at a current of 1000 mA (1C) under room temperature, to measure a charging time period elapsed until the internal pressure of the battery reaches 10 $kgf/cm^2$. The charging time period was shown as the internal pressure characteristics in the early stages of the nickel-hydrogen secondary battery in the following Table 3. In determining the internal pressure characteristics, tests were conducted with respect to four nickel-hydrogen secondary batteries, and the average value thereof was shown.

TABLE 3

| | $AlCl_3$ + $CoCl_2$ (% by weight) | anthra-quinone (ppm) | internal pressure characteristics (min) pH | | | | | |
| --- | --- | --- | --- | --- | --- | --- | --- | --- |
| | | | 0.5 | 0.7 | 1.0 | 1.5 | 2.0 | 3.0 |
| embodiment 4 | 1 + 1 | 50 | 115 | 140 | 145 | 140 | 135 | 105 |
| embodiment 5 | 3 + 3 | 50 | 110 | 140 | 145 | 145 | 135 | 100 |

TABLE 3-continued

|  | AlCl$_3$ + CoCl$_2$ (% by weight) | anthra-quinone (ppm) | internal pressure characteristics (min) pH | | | | | |
|---|---|---|---|---|---|---|---|---|
|  |  |  | 0.5 | 0.7 | 1.0 | 1.5 | 2.0 | 3.0 |
| embodiment 6 | 5 + 5 | 50 | 105 | 145 | 145 | 145 | 135 | 100 |
| comparative example 4 | 7 + 7 | 50 | 100 | 125 | 120 | 120 | 110 | 100 |
| comparative example 5 | 0 | 50 | 95 | 115 | 120 | 120 | 110 | 90 |
| comparative example 6 | 0 | 0 | 95 | 110 | 125 | 120 | 115 | 90 |

As apparent from the results, even when the initial pH of the acid solution was changed, the charging time period indicating the internal pressure characteristics of the battery in each of the embodiments 4 to 6 in which the value of a/b was not less than 1.30 as in the above-mentioned embodiments 1 to 3 was longer than that in each of the comparative examples 4 to 6 in which the value of a/b was less than 1.30 as in the comparative examples 1 to 3. Therefore, the emission of gas in the early stages was restrained, so that a sufficient discharge capacity was obtained from the early stages.

In surface-treating the hydrogen absorbing alloy in the acid solution as described above, when the hydrogen absorbing alloy was treated in an acid solution whose initial pH was in the range of 0.7 to 2.0, the internal pressure characteristics of the nickel-hydrogen secondary battery were further improved.

(Embodiments 7 to 9 and Comparative Examples 7 to 9)

In the embodiments 7 to 9 and the comparative examples 7 to 9, in surface-treating in an acid solution hydrogen absorbing alloys obtained by grinding in the same manner as described in the embodiments 1 to 3 and the comparative examples 1 to 3, the initial pH of the acid solution was set to 1.0, and the amounts of AlCl$_3$, CoCl$_2$ and anthraquinone which were added to the acid solution in the embodiment 7 were made the same as those in the embodiment 1, the amounts in the embodiment 8 were made the same as those in the embodiment 2, the amounts in the embodiment 9 were made the same as those in the embodiment 3, the amounts in the comparative example 7 were made the same as those in the comparative example 1, the amounts in the comparative example 8 were made the same as those in the comparative example 2, and the amounts in the comparative example 9 were made the same as those in the comparative example 3 as shown in the following Table 4, while the liquid temperature of the acid solution was changed as shown in the same table, to respectively surface-treat the hydrogen absorbing alloys.

Even when the liquid temperature of the acid solution was changed as described above, the value of a/b was hardly-changed, that is, the value in the embodiment 7 was approximately the same as that in the embodiment 1, the value in the embodiment 8 was approximately the same as that in the embodiment 2, the value in the embodiment 9 was approximately the same as that in the embodiment 3, the value in the comparative example 7 was approximately the same as that in the comparative example 1, the value in the comparative example 8 was approximately the same as that in the comparative example 2, and the value in the comparative example 9 was approximately the same as that in the comparative example 3.

Hydrogen absorbing alloy electrodes were then respectively fabricated in the same manner as described in the embodiments 1 to 3 and the comparative examples 1 and 2 using the hydrogen absorbing alloys obtained in the above-mentioned manner, and nickel-hydrogen secondary batteries were respectively fabricated using the hydrogen absorbing alloy electrodes as their negative electrodes.

The internal pressure in the early stages of each of the nickel-hydrogen secondary batteries was measured in the same manner as described above. The results thereof were shown in the following Table 4.

TABLE 4

|  | AlCl$_3$ + CoCl$_2$ (% by weight) | anthra-quinone (ppm) | internal pressure characteristics (min) liquid temperature of acid solution (° C.) | | | | | |
|---|---|---|---|---|---|---|---|---|
|  |  |  | 10.0 | 25.0 | 40.0 | 60.0 | 70.0 | 80.0 |
| embodiment 7 | 1 + 1 | 50 | 125 | 140 | 140 | 145 | 140 | 100 |
| embodiment 8 | 3+3 | 50 | 130 | 145 | 145 | 145 | 140 | 115 |
| embodiment 9 | 5 + 5 | 50 | 130 | 145 | 145 | 145 | 145 | 100 |
| comparative example 7 | 7 + 7 | 50 | 120 | 120 | 135 | 130 | 110 | 100 |
| comparative example 8 | 0 | 50 | 115 | 120 | 120 | 120 | 110 | 90 |
| comparative example 9 | 0 | 0 | 120 | 125 | 120 | 120 | 110 | 100 |

As apparent from the results, when the liquid temperature of the acid solution was in the range of 25.0° C. to 70.0° C., the charging time period indicating the internal pressure characteristics of the battery in each of the embodiments 7 to 9 in which the value of a/b was not less than 1.30 as described above was longer than that in each of the comparative examples 7 to 9 in which the value of a/b was less than 1.30. Therefore, the emission of gas in the early stages was restrained, so that a sufficient discharge capacity was obtained from the early stages.

(Embodiments 10 to 12 and Comparative Examples 10 and 11)

In the embodiments 10 to 12 and the comparative examples 10 and 11, in surface-treating in an acid solution hydrogen absorbing alloys obtained by grinding in the same manner as described in the embodiments 1 to 3 and the comparative examples 1 to 3, the initial pH of the acid solution was set to 1.0, the liquid temperature thereof was set to 25° C., and the amounts of $AlCl_3$ and $CoCl_2$ which were added to the acid solution in the embodiment 10 were made the same as those in the embodiment 1, the amounts in the embodiment 11 were made the same as those in the embodiment 2, the amounts in the embodiment 12 were made the same as those in the embodiment 3, the amounts in the comparative example 10 were made the same as those in the comparative example 1, and the amounts in the comparative example 11 were made the same as those in the comparative example 2 as shown in the following Table 5, while the amount of anthraquinone added to the acid solution was changed as shown in the same table, to respectively surface-treat the hydrogen absorbing alloys.

Even when the amount of anthraquinone added to the acid solution was changed as described above, the value of a/b was hardly changed, that is, the value in the embodiment 10 was approximately the same as that in the embodiment 1, the value in the embodiment 11 was approximately the same as that in the embodiment 2, the value in the embodiment 12 was approximately the same as that in the embodiment 3, the value in the comparative example 10 was approximately the same as that in the comparative example 1, and the value in the comparative example 11 was approximately the same as that in the comparative example 2.

Hydrogen absorbing alloy electrodes were then respectively fabricated in the same manner as described in the embodiments 1 to 3 and the comparative examples 1 and 2 using the hydrogen absorbing alloys obtained in the above-mentioned manner, and nickel-hydrogen secondary batteries were respectively fabricated using the hydrogen absorbing alloy electrodes as their negative electrodes.

The internal pressure in the early stages of each of the nickel-hydrogen secondary batteries was measured in the same manner as described above. The results thereof were shown in the following Table 5.

TABLE 5

|  | $AlCl_3$ + $CoCl_2$ (% by weight) | internal pressure characteristics (min) amount of added anthraquinone (ppm) | | | | | |
|---|---|---|---|---|---|---|---|
|  |  | 0.0 | 5.0 | 10.0 | 50.0 | 100.0 | 200.0 |
| embodiment 10 | 1 + 1 | 125 | 140 | 145 | 145 | 145 | 105 |
| embodiment 11 | 3 + 3 | 125 | 140 | 145 | 145 | 140 | 105 |
| embodiment 12 | 5 + 5 | 125 | 145 | 145 | 145 | 145 | 105 |
| comparative example 10 | 7 + 7 | 125 | 125 | 130 | 120 | 120 | 100 |
| comparative example 11 | 0 | 125 | 110 | 120 | 120 | 90 | 80 |

As apparent from the results, when the amount of anthraquinone added to the acid solution was in the range of 5.0 ppm to 100.0 ppm, the charging time period indicating the internal pressure characteristics of the battery in each of the embodiments 10 to 12 in which the value of a/b was not less than 1.30 as described above was longer than that in each of the comparative examples 10 to 11 in which the value of a/b was less than 1.30. Therefore, the emission of gas in the early stages was restrained, so that a sufficient discharge capacity was obtained from the early stages.

(Embodiments 13 to 15 and Comparative Example 12)

In the embodiments 13 to 15 and the comparative example 12, in surface-treating in an acid solution hydrogen absorbing alloys obtained by grinding in the same manner as described in the embodiments 1 to 3 and the comparative examples 1 to 3, the initial pH of the acid solution was set to 1.0, the liquid temperature thereof was set to 25° C., and 50 ppm of anthraquinone was added, while aluminum hydroxide {$Al(OH)_3$} and cobalt chloride ($CoCl_2$) were respectively added as an aluminum compound and a cobalt compound to the acid solution in proportions as shown in the following Table 6.

The abundance ratio of each type of atoms in a portion to a depth of 30 Å from the surface of each of the hydrogen absorbing alloys surface-treated in the above-mentioned manner was measured in the same manner as described above.

The sum a of the respective abundance ratios of Co atoms and Al atoms in the portion to a depth of 30 Å from the surface of each of the hydrogen absorbing alloys was found, and the sum b of the respective abundance ratios of Co atoms and Al atoms in a bulk region inside the hydrogen absorbing alloy was found, to calculate a/b in the same manner as described above. The results were together shown in the following Table 6.

TABLE 6

|  | embodiment 13 | embodiment 14 | embodiment 15 | comparative example 12 |
|---|---|---|---|---|
| treating conditions of acid solution |  |  |  |  |
| pH | 1.0 | 1.0 | 1.0 | 1.0 |
| liquid temperature (° C.) | 25 | 25 | 25 | 25 |
| anthraquinone (ppm) | 50 | 50 | 50 | 50 |
| $Al(OH)_3$ (% by weight) | 1 | 3 | 5 | 7 |
| $CoCl_2$ (% by weight) | 1 | 3 | 5 | 7 |
| abundance ratio of atoms on surface |  |  |  |  |
| Co (atm/%) | 20.03 | 21.08 | 3.54 | 9.99 |
| Al (atm/%) | 2.78 | 3.23 | 3.44 | 2.56 |
| a (atm/%) | 22.81 | 24.31 | 6.98 | 2.55 |

TABLE 6-continued

|  | embodiment 13 | embodiment 14 | embodiment 15 | comparative example 12 |
|---|---|---|---|---|
| abundance ratio of atoms inside | | | | |
| b (atm/%) | 17.34 | 17.90 | 7.99 | 7.98 |
| a/b | 1.32 | 1.36 | 1.50 | 1.25 |

As a result, in the hydrogen absorbing alloys in the embodiments 13 to 15, the value of a/b was not less than 1.30, which satisfied the conditions of the present invention. On the other hand, in the hydrogen absorbing alloy in the comparative example 12 which was surface-treated using an acid solution to which 7% by weight, which is more than 5% by weight, of $Al(OH)_3$ and $CoCl_2$ were added, the value of a/b was less than 1.30.

(Embodiments 16 to 18 and Comparative Example 13)

In the embodiments 16 to 18 and the comparative example 13, in surface-treating in an acid solution the above-mentioned hydrogen absorbing alloys, the liquid temperature of the acid solution was set to 25° C., and 50 ppm of anthraquinone was added to the acid solution as in the embodiments 13 to 15 and the comparative example 12, and the amounts of $Al(OH)_3$ and $CoCl_2$ which were added to the acid solution in the embodiment 16 were made the same as those in the embodiment 13, the amounts in the embodiment 17 were made the same as those in the embodiment 14, the amounts in the embodiment 18 were made the same as those in the embodiment 15, and the amounts in the comparative example 13 were made the same as those in the comparative example 12 as shown in the following Table 7, while the initial pH of the acid solution was changed as shown in the same table, to respectively surface-treat the hydrogen absorbing alloys.

Even when the initial pH of the acid solution was changed as described above, the value of a/b was hardly changed, that is, the value in the embodiment 16 was approximately the same as that in the embodiment 13, the value in the embodiment 17 was approximately the same as that in the embodiment 14, the value in the embodiment 18 was approximately the same as that in the embodiment 15, and the value in the comparative example 13 was approximately the same as that in the comparative example 12.

Hydrogen absorbing alloy electrodes were then respectively fabricated in the same manner as described in the embodiments 1 to 3 and the comparative examples 1 and 2 using the hydrogen absorbing alloys obtained in the above-mentioned manner, and nickel-hydrogen secondary batteries were respectively fabricated using the hydrogen absorbing alloy electrodes as their negative electrodes.

The internal pressure in the early stages of each of the nickel-hydrogen secondary batteries thus fabricated was measured in the same manner as described above. The results thereof were together shown in the following Table 7.

TABLE 7

|  | $Al(OH)_3$ + $CoCl_2$ (% by weight) | internal pressure characteristics (min) pH | | | | | |
|---|---|---|---|---|---|---|---|
|  |  | 0.5 | 0.7 | 1.0 | 1.5 | 2.0 | 3.0 |
| embodiment 16 | 1 + 1 | 110 | 140 | 145 | 140 | 135 | 105 |
| embodiment 17 | 3 + 3 | 115 | 145 | 150 | 145 | 140 | 100 |
| embodiment 18 | 5 + 5 | 115 | 145 | 145 | 145 | 135 | 100 |
| comparative example 13 | 7 + 7 | 100 | 125 | 125 | 120 | 115 | 100 |

As apparent from the results, when the initial pH of the acid solution was changed, the charging time period indicating the internal pressure characteristics of the battery in each of the embodiments 16 to 18 in which the value of a/b was not less than 1.30 was longer than that in the comparative example 13 in which the value of a/b was less than 1.30. Therefore, the emission of gas in the early stages was restrained, so that a sufficient discharge capacity was obtained from the early stages.

In surface-treating the hydrogen absorbing alloy in the acid solution as described above, when the hydrogen absorbing alloy was treated in an acid solution whose internal pH was in the range of 0.7 to 2.0, the internal pressure characteristics of the nickel-hydrogen secondary battery were further improved.

(Embodiments 19 to 21 and Comparative Example 14)

In the embodiments 19 to 21 and the comparative example 14, in surface-treating in an acid solution the above-mentioned hydrogen absorbing alloys, the initial pH of the acid solution was set to 1.0, and 50 ppm of anthraquinone was added to the acid solution as in the embodiments 13 to 15 and the comparative example 12, and the amounts of $Al(OH)_3$ and $CoCl_2$ which were added to the acid solution in the embodiment 19 were made the same as those in the embodiment 13, the amounts in the embodiment 20 were made the same as those in the embodiment 14, the amounts in the embodiment 21 were made the same as those in the embodiment 15, and the amounts in the comparative example 14 were made the same as those in the comparative example 12 as shown in the following Table 8, while the liquid temperature of the acid solution was changed as shown in the same table, to respectively surface-treat the hydrogen absorbing alloys.

Even when the liquid temperature of the acid solution was changed as described above, the value of a/b was hardly changed, that is, the value in the embodiment 19 was approximately the same as that in the embodiment 13, the value in the embodiment 20 was approximately the same as that in the embodiment 14, the value in the embodiment 21 was approximately the same as that in the embodiment 15, and the value in the comparative example 14 was approximately the same as that in the comparative example 12.

Hydrogen absorbing alloy electrodes were then respectively fabricated in the same manner as described in the embodiments 1 to 3 and the comparative examples 1 and 2 using the hydrogen absorbing alloys obtained in the above-mentioned manner, and nickel-hydrogen secondary batteries were respectively fabricated using the hydrogen absorbing alloy electrodes as their negative electrodes.

The internal pressure in the early stages of each of the nickel-hydrogen secondary batteries thus fabricated was measured in the same manner as described above. The results thereof were together shown in the following Table 8.

TABLE 8

| | Al(OH)₃ + CoCl₂ (% by weight) | internal pressure characteristics (min) liquid temperature of acid solution (° C.) | | | | | |
|---|---|---|---|---|---|---|---|
| | | 10.0 | 25.0 | 40.0 | 60.0 | 70.0 | 80.0 |
| embodiment 19 | 1 + 1 | 120 | 145 | 140 | 145 | 140 | 105 |
| embodiment 20 | 3 + 3 | 135 | 150 | 150 | 145 | 145 | 110 |
| embodiment 21 | 5 + 5 | 130 | 145 | 145 | 145 | 145 | 110 |
| comparative example 14 | 7 + 7 | 120 | 125 | 135 | 135 | 110 | 105 |

As apparent from the results, when the liquid temperature of the acid solution was set in the range of 25.0° C. to 70.0° C., the charging time period indicating the internal pressure characteristics of the battery in each of the embodiments 19 to 21 in which the value of a/b was not less than 1.30 as described above was longer than that in the comparative example 14 in which the value of a/b was less than 1.30. Therefore, the emission of hydrogen gas in the early stages was restrained, so that a sufficient discharge capacity was obtained from the early stages.

(Embodiments 22 to 24 and Comparative Example 15)

In the embodiments 22 to 24 and the comparative example 15, in surface-treating in an acid solution the above-mentioned hydrogen absorbing alloys, the initial pH of the acid solution was set to 1.0, and the liquid temperature thereof was set to 25° C. as in the embodiments 13 to 15 and the comparative example 12, and the amounts of Al(OH)₃ and CoCl₂ which were added to the acid solution in the embodiment 22 were made the same as those in the embodiment 13, the amounts in the embodiment 23 were made the same as those in the embodiment 14, the amounts in the embodiment 24 were made the same as those in the embodiment 15, and the amounts in the comparative example 15 were made the same as those in the comparative example 12 as shown in the following Table 9, while the amount of anthraquinone added to the acid solution was changed as shown in the same table, to respectively surface-treat the hydrogen absorbing alloys.

Even when the amount of anthraquinone added to the acid solution was changed as described above, the value of a/b was hardly changed, that is, the value in the embodiment 22 was approximately the same as that in the embodiment 13, the value in the embodiment 23 was approximately the same as that in the embodiment 14, the value in the embodiment 24 was approximately the same as that in the embodiment 15, and the value in the comparative example 15 was approximately the same as that in the comparative example 12.

Hydrogen absorbing alloy electrodes were then respectively fabricated in the same manner as described in the embodiments 1 to 3 and the comparative examples 1 and 2 using the hydrogen absorbing alloys obtained in the above-mentioned manner, and nickel-hydrogen secondary batteries were respectively fabricated using the hydrogen absorbing alloy electrodes as their negative electrodes.

The internal pressure in the early stages of each of the nickel-hydrogen secondary batteries thus fabricated was measured in the same manner as described above. The results thereof were together shown in the following Table 9.

TABLE 9

| | Al(OH)₃ + CoCl₂ (% by weight) | internal pressure characteristics (min) amount of added anthraquinone (ppm) | | | | | |
|---|---|---|---|---|---|---|---|
| | | 0.0 | 5.0 | 10.0 | 50.0 | 100.0 | 200.0 |
| embodiment 22 | 1 + 1 | 120 | 140 | 145 | 145 | 145 | 100 |
| embodiment 23 | 3 + 3 | 125 | 145 | 150 | 150 | 145 | 110 |
| embodiment 24 | 5 + 5 | 120 | 145 | 145 | 145 | 145 | 100 |
| comparative example 15 | 7 + 7 | 120 | 125 | 130 | 125 | 120 | 100 |

As apparent from the results, when the amount of anthraquinone added to the acid solution was in the range of 5.0 ppm to 100.0 ppm, the charging time period indicating the internal pressure characteristics of the battery in each of the embodiments 12 to 24 in which the value of a/b was not less than 1.30 as described above was longer than that in the comparative example 15 in which the value of a/b was less than 1.30. Therefore, the emission of hydrogen gas in the early stages was restrained, so that a sufficient discharge capacity was obtained from the early stages.

(Embodiments 25 to 27 and Comparative Examples 16 to 18)

In the embodiments 25 to 27 and the comparative examples 16 to 18, hydrogen absorbing alloy powder having a composition of $MmNi_{3.1}Co_{0.8}Al_{0.4}Mn_{0.7}$ was also used as described above.

The surface of the hydrogen absorbing alloy powder was treated in an acid solution using hydrochloric acid.

In thus treating the surface of the hydrogen absorbing alloy powder in the acid solution, the initial pH of the acid solution was set to 1.0, and the liquid temperature thereof was set to 25° C., as shown in the following Table 10. Further, in the embodiments 25 to 27 and the comparative example 16, aluminum chloride ($AlCl_3$) was added as an aluminum compound to the acid solution in a proportion as shown in the same table, and 50 ppm of anthraquinone was added. In the comparative example 17, 50 ppm of only anthraquinone was added. In the comparative example 18, neither of aluminum chloride and anthraquinone was added.

A hydrogen absorbing alloy was immersed in each of the acid solutions adjusted in the above-mentioned manner until the pH thereof would be 7.0, to treat the surface of the hydrogen absorbing alloy.

The abundance ratio of each type of atoms in a portion to a depth of 30 Å from the surface of each of the hydrogen absorbing alloys surface-treated in the above-mentioned manner was then measured in the above-mentioned manner.

The sum A of the respective abundance ratios of Co atoms, Al atoms and Mn atoms in the portion to a depth of 30 Å from the surface of each of the hydrogen absorbing alloys was found in the same manner as described above, and the sum B of the respective abundance ratios of Co atoms, Al atoms and Mn atoms in a bulk region inside the hydrogen absorbing alloy was found, to calculate A/B. The results thereof were together shown in the following Table 10.

TABLE 10

| | embodiment | | | comparative example | | |
|---|---|---|---|---|---|---|
| | 25 | 26 | 27 | 16 | 17 | 18 |
| treating conditions of acid solution | | | | | | |
| pH | 1.0 | 1.0 | 1.0 | 1.0 | 1.0 | 1.0 |
| liquid temperature (° C.) | 25 | 25 | 25 | 25 | 25 | 25 |
| $AlCl_3$ (% by weight) | 1 | 3 | 5 | 7 | 0 | 0 |
| anthraquinone (ppm) | 50 | 50 | 50 | 50 | 50 | 0 |
| abundance ratio of atoms on surface | | | | | | |
| Co (atm/%) | 19.87 | 20.98 | 22.12 | 19.23 | 15.56 | 15.56 |
| Al (atm/%) | 2.23 | 2.56 | 2.98 | 2.34 | 1.20 | 1.20 |
| Mn (atm/%) | 4.78 | 5.23 | 5.56 | 5.34 | 3.66 | 3.66 |
| A (atm/%) | 26.88 | 28.77 | 30.66 | 26.91 | 20.42 | 20.42 |
| abundance ratio of atoms inside | | | | | | |
| B (atm/%) | 22.02 | 22.76 | 23.54 | 22.98 | 21.81 | 21.81 |
| A/B | 1.22 | 1.26 | 1.30 | 1.17 | 0.94 | 0.94 |

As a result, in the hydrogen absorbing alloys in the embodiments 25 to 27, the value of A/B was not less than 1.20, which satisfied the conditions of the present invention. On the other hand, in the hydrogen absorbing alloy in the comparative example 16 which was treated using an acid solution to which 7% by weight, which is more than 5% by weight, of $AlCl_3$ was added, and the hydrogen absorbing alloy in each of the comparative examples 17 and 18 which was treated using an acid solution to which no $AlCl_3$ was added, the value of A/B was less than 1.20.

20 parts by weight of a 5% solution of polyethylene oxide which is a binder was added and mixed with 100 parts by weight of each of the hydrogen absorbing alloys surface-treated as shown in the embodiments 25 to 27 and the comparative examples 16 and 17, and paste was prepared, was applied to both surfaces of a conductive substrate composed of a punched metal nickel-plated and was dried at room temperature, and was then cut to predetermined sizes, to fabricate each of hydrogen absorbing alloy electrodes in the embodiments 25 to 27 and the comparative examples 16 and 17.

Nickel-hydrogen secondary batteries were respectively fabricated in the same manner as described in the embodiments 1 to 3 and the comparative examples 1 and 2 using the hydrogen absorbing alloy electrodes thus fabricated as their negative electrodes.

Each of the nickel-hydrogen secondary batteries fabricated in the above-mentioned manner was charged at a charging current of 0.2 C for six hours under room temperature (ordinary temperature), and was then discharged at a discharging current of 0.2 C under low temperature of 0° C., to find the initial discharge capacity of the nickel-hydrogen secondary battery. The results thereof were shown in the following Table 11.

TABLE 11

| type of hydrogen absorbing alloy electrode | initial discharge capacity (mAh) |
|---|---|
| embodiment 25 | 675 |
| embodiment 26 | 677 |
| embodiment 27 | 699 |
| comparative example 16 | 473 |
| comparative example 17 | 445 |

As apparent from the results, in each of the nickel-hydrogen secondary batteries using as their negative electrodes the hydrogen absorbing alloy electrodes in the embodiments 25 to 27 using the hydrogen absorbing alloys in which the value of A/B was not less than 1.20, the initial discharge capacity thereof under low temperature of 0° C. was higher, and the discharge characteristics thereof under low temperature were improved, as compared with those in each of the nickel-hydrogen secondary batteries using as their negative electrodes the hydrogen absorbing alloy electrodes in the comparative examples 16 and 17 respectively using the hydrogen absorbing alloys in which the value of A/B was less than 1.20.

(Embodiments 28 to 30 and Comparative Examples 19 to 21)

In the embodiments 28 to 30 and the comparative examples 19 to 21, in surface-treating in an acid solution the above-mentioned hydrogen absorbing alloys, the liquid temperature of the acid solution was set to 25° C., and the amounts of $AlCl_3$ and anthraquinone which were added to the acid solution in the embodiment 28 were made the same as those in the embodiment 25, the amounts in the embodiment 29 were made the same as those in the embodiment 26, the amounts in the embodiment 30 were made the same as those in the embodiment 27, the amounts in the comparative example 19 were made the same as those in the comparative example 16, the amounts in the comparative example 20 were made the same as those in the comparative example 17, and the amount in the comparative example 21 were made the same as those in the comparative example 18, while the initial pH of the acid solution was changed as shown in the same table, to respectively surface-treat the hydrogen absorbing alloys.

Even when the initial pH of the acid solution was changed as described above, the value of A/B was hardly changed, that is, the value in the embodiment 28 was approximately the same as that in the embodiment 25, the value in the embodiment 29 was approximately the same as that in the embodiment 26, the value in the embodiment 30 was approximately the same as that in the embodiment 27, the value in the comparative example 19 was approximately the same as that in the comparative example 16, the value in the comparative example 20 was approximately the same as that in the comparative example 17, and the value in the comparative example 21 was approximately the same as that in the comparative example 18.

Hydrogen absorbing alloy electrodes were then respectively fabricated in the same manner as described in the embodiments 25 to 27 and the comparative examples 16 and 17 using the hydrogen absorbing alloys obtained in the above-mentioned manner, and nickel-hydrogen secondary batteries were respectively fabricated using the hydrogen absorbing alloy electrodes as their negative electrodes.

The internal pressure of each of the nickel-hydrogen secondary batteries thus fabricated was measured while charging the battery at a current of 1000 mA (1C) under room temperature, to find a charging time period elapsed until the internal pressure of the battery reaches 10 $kgf/cm^2$. The charging time period was shown as the internal pressure characteristics in the early stages of the nickel-hydrogen secondary battery in the following Table 12. In determining the internal pressure characteristics, tests were conducted with respect to four nickel-hydrogen secondary batteries, and the average value thereof was shown.

TABLE 12

| | AlCl₃ (% by weight) | anthra-quinone (ppm) | internal pressure characteristics (min) pH | | | | | |
|---|---|---|---|---|---|---|---|---|
| | | | 0.5 | 0.7 | 1.0 | 1.5 | 2.0 | 3.0 |
| embodiment 28 | 1 | 50 | 100 | 135 | 140 | 140 | 135 | 100 |
| embodiment 29 | 3 | 50 | 100 | 135 | 145 | 145 | 135 | 100 |
| embodiment 30 | 5 | 50 | 100 | 145 | 145 | 145 | 135 | 100 |
| comparative example 19 | 7 | 50 | 95 | 125 | 120 | 120 | 110 | 90 |
| comparative example 20 | o | 50 | 95 | 115 | 120 | 120 | 110 | 90 |
| comparative example 21 | 0 | 0 | 95 | 110 | 125 | 120 | 115 | 90 |

As apparent from the results, even when the initial pH of the acid solution was changed, the charging time period indicating the internal pressure characteristics of the battery in each of the embodiments 28 to 30 in which the value of A/B was not less than 1.20 as in the above-mentioned embodiments 25 to 27 was longer than that in each of the comparative examples 19 to 21 in which the value of A/B was less than 1.20 as in the comparative examples 16 to 17. Therefore, the emission of hydrogen gas in the early stages was restrained, so that a sufficient discharge capacity was obtained from the early stages.

In surface-treating the hydrogen absorbing alloy in the acid solution as described above, when the hydrogen absorbing alloy was treated in an acid solution whose initial pH was in the range of 0.7 to 2.0, the internal pressure characteristics of each of the nickel-hydrogen secondary batteries were improved.

(Embodiments 31 to 33 and Comparative Examples 22 to 24)

In the embodiments 31 to 33 and the comparative examples 22 to 24, in surface-treating in an acid solution the above-mentioned hydrogen absorbing alloys, the initial pH of the acid solution was set to 1.0, and the amounts of AlCl₃ and anthraquinone which were added to the acid solution in the embodiment 31 were made the same as those in the embodiment 25, the amounts in the embodiment 32 were made the same as those in the embodiment 26, the amounts in the embodiment 33 were made the same as those in the embodiment 27, the amounts in the comparative example 22 were made the same as those in the comparative example 16, the amounts in the comparative example 23 were made the same as those in the comparative example 17, and the amounts in the comparative example 24 were made the same as those in the comparative example 18 as shown in the following Table 13, while the liquid temperature of the acid solution was changed as shown in the same table, to respectively surface-treat the hydrogen absorbing alloys.

Even when the liquid temperature of the acid solution was changed as described above, the value of A/B was hardly changed, that is, the value in the embodiment 31 was approximately the same as that in the embodiment 25, the value in the embodiment 32 was approximately the same as that in the embodiment 26, the value in the embodiment 33 was approximately the same as that in the embodiment 27, the value in the comparative example 22 was approximately the same as that in the comparative example 16, the value in the comparative example 23 was approximately the same as that in the comparative example 17, and the value in the comparative example 24 was approximately the same as that in the comparative example 18.

Hydrogen absorbing alloy electrodes were then respectively fabricated in the same manner as described in the embodiments 25 to 27 and the comparative examples 16 and 17 using the hydrogen absorbing alloys obtained in the above-mentioned manner, and nickel-hydrogen secondary batteries were respectively fabricated using the hydrogen absorbing alloy electrodes as their negative electrodes.

The internal pressure in the early stages of each of the nickel-hydrogen secondary batteries thus fabricated was measured in the same manner as described above. The results thereof were shown in the following Table 13.

TABLE 13

| | AlCl₃ (% by weight) | anthra-quinone (ppm) | internal pressure characteristics (min) liquid temperature of acid solution (° C.) | | | | | |
|---|---|---|---|---|---|---|---|---|
| | | | 10.0 | 25.0 | 40.0 | 60.0 | 70.0 | 80.0 |
| embodiment 31 | 1 | 50 | 120 | 140 | 140 | 145 | 135 | 95 |
| embodiment 32 | 3 | 50 | 120 | 145 | 145 | 145 | 140 | 95 |
| embodiment 33 | 5 | 50 | 120 | 145 | 145 | 145 | 145 | 95 |
| comparative example 22 | 7 | 50 | 120 | 120 | 135 | 130 | 110 | 100 |

TABLE 13-continued

| | AlCl₃ (% by weight) | anthra-quinone (ppm) | internal pressure characteristics (min) liquid temperature of acid solution (° C.) | | | | |
|---|---|---|---|---|---|---|---|
| | | | 10.0 | 25.0 | 40.0 | 60.0 | 70.0 | 80.0 |
| comparative example 23 | 0 | 59 | 115 | 120 | 120 | 120 | 110 | 90 |
| comparative example 24 | 0 | 0 | 120 | 125 | 120 | 120 | 110 | 100 |

As apparent from the results, when the liquid temperature of the acid solution was set in the range of 25.0° C. to 70.0° C., the charging time period indicating the internal pressure characteristics of the battery in each of the embodiments 31 to 33 in which the value of A/B was not less than 1.20 as described above was longer than that in each of the comparative examples 22 to 24 in which the value of A/B was less than 1.20. Therefore, the emission of gas in the early stages was restrained, so that a sufficient discharge capacity was obtained from the early stages.

(Embodiments 34 to 36 and Comparative Examples 25 and 26)

In the embodiments 34 to 36 and the comparative examples 25 to 26, in surface-treating in an acid solution the above-mentioned hydrogen absorbing alloys, the initial pH of the acid solution was set to 1.0, the liquid temperature thereof was set to 25° C., and the amount of AlCl₃ added to the acid solution in the embodiment 34 was made the same as that in the embodiment 25, the amount in the embodiment 35 was made the same as that in the embodiment 26, the amount in the embodiment 37 was made the same as that in the embodiment 27, the amount in the comparative example 25 was made the same as that in the comparative example 16, and the amount in the comparative example 26 was made the same as that in the comparative example 17 as shown in the following Table 14, while the amount of anthraquninone added to the acid solution was changed as shown in the same table, to respectively surface-treat the hydrogen absorbing alloys.

Even when the amount of anthraquinnone added to the acid solution was changed as described above, the value of A/B was hardly changed, that is, the value in the embodiment 34 was approximately the same as that in the embodiment 25, the value in the embodiment 35 was approximately the same as that in the embodiment 26, the value in the embodiment 36 was approximately the same as that in the embodiment 27, the value in the comparative example 25 was approximately the same as that in the comparative example 16, and the value in the comparative example 26 was approximately the same as that in the comparative example 17.

Hydrogen absorbing alloy electrodes were then respectively fabricated in the same manner as described in the embodiments 25 to 27 and the comparative examples 16 and 17 using the hydrogen absorbing alloys obtained in the above-mentioned manner, and nickel-hydrogen secondary battery were respectively fabricated using the hydrogen absorbing alloy electrodes as their negative electrodes.

The internal pressure in the early stages of each of the nickel-hydrogen secondary batteries thus fabricated was measured in the same manner as described above. The results thereof were shown in the following Table 14.

TABLE 14

| | AlCl₃ (% by weight) | internal pressure characteristics (min) amount of added anthraquinone (ppm) | | | | | |
|---|---|---|---|---|---|---|---|
| | | 0.0 | 5.0 | 10.0 | 50.0 | 100.0 | 200.0 |
| embodiment 34 | 1 | 125 | 140 | 140 | 140 | 135 | 95 |
| embodiment 35 | 3 | 125 | 14& | 145 | 145 | 140 | 95 |
| embodiment 36 | 5 | 130 | 145 | 145 | 145 | 145 | 95 |
| comparative example 25 | 7 | 125 | 130 | 130 | 120 | 120 | 100 |
| comparative example 26 | 0 | 125 | 110 | 120 | 120 | 90 | 80 |

As apparent from the results, when the amount of anthraquinone added to the acid solution was in the range of 5.0 ppm to 100.0 ppm, the charging time period indicating the internal pressure characteristics of the battery in each of the embodiments 34 to 36 in which the value of A/B was not less than 1.20 as described above was longer than that in each of the comparative examples 25 and 26 in which the value of A/B was less than 1.20. Therefore, the emission of hydrogen gas in the early stages was restrained, so that a sufficient discharge capacity was obtained from the early stages.

(Embodiments 37 to 39 and Comparative Example 27)

In the embodiments 37 to 39 and the comparative example 27, in surface-treating in an acid solution the above-mentioned hydrogen absorbing alloys, the initial pH of the acid solution was set to 1.0, and the liquid temperature thereof was set to 25° C. as in the embodiments 25 to 27 and the comparative examples 16 to 18, and 50 ppm of anthraquinone was added, while aluminum hydroxide Al(OH)₃ was added as an aluminum compound to the acid solution in a proportion as shown in the following Table 15.

The abundance ratio of each type of atoms in a portion to a depth of 30 Å from the surface of each of the hydrogen absorbing alloys surface-treated in the above-mentioned manner was measured in the above-mentioned manner.

The sum A of the respective abundance ratios of Co atoms, Al atoms and Mn atoms in the portion to a depth of 30 Å from the surface of each of the hydrogen absorbing alloys was found, and the sum B of the respective abundance ratios of Co atoms, Al atoms and Mn atoms in a bulk region inside the hydrogen absorbing alloy was found, to calculate A/B in the same manner as described above. The results thereof were together shown in the following

TABLE 15

|  | embodiment 37 | embodiment 38 | embodiment 39 | comparative example 27 |
|---|---|---|---|---|
| treating conditions of acid solution | | | | |
| pH | 1.0 | 1.0 | 1.0 | 1.0 |
| liquid temperature (° C.) | 25 | 25 | 25 | 25 |
| anthraquinone (ppm) | 50 | 50 | 50 | 50 |
| Al(OH)$_3$ (% by weight) | 1 | 3 | 5 | 7 |
| abundance ratio of atoms on surface | | | | |
| Co (atm/%) | 20.10 | 21.02 | 23.09 | 20.09 |
| Al (atm/%) | 2.43 | 2.66 | 3.01 | 2.34 |
| Mn (atm/%) | 4.88 | 5.32 | 6.01 | 3.76 |
| A (atm/%) | 27.41 | 29.00 | 32.11 | 26.19 |
| abundance ratio of atoms inside | | | | |
| B (atm/%) | 22.30 | 22.90 | 23.46 | 22.09 |
| A/B | 1.23 | 1.27 | 1.37 | 1.19 |

As a result, in the hydrogen absorbing alloys in the embodiments 37 to 39, the value of A/B was not less than 1.20, which satisfied the conditions of the present invention. On the other hand, in the hydrogen absorbing alloy in the comparative example 27 which was treated using an acid solution to which 7% by weight, which is more than 5% by weight, of Al(OH)$_3$ was added, the value of A/B was less than 1.20.

(Embodiments 40 to 42 and Comparative Example 28)

In the embodiments 40 to 42 and the comparative example 28, in surface-treating in an acid solution the above-mentioned hydrogen absorbing alloys, the liquid temperature of the acid solution was set to 25° C., and 50 ppm of anthraquinone was added to the acid solution as in the embodiments 37 to 39 and the comparative example 27, and the amount of aluminum hydroxide Al(OH)$_3$ added to the acid solution in the embodiment 40 was made the same as that in the embodiment 37, the amount in the embodiment 41 was made the same as that in the embodiment 38, the amount in the embodiment 42 was made the same as that in the embodiment 39, and the amount in the comparative example 28 was made the same as that in the comparative example 27 as shown in the following Table 16, while the initial pH of the acid solution was changed as shown in the same table, to respectively surface-treat the hydrogen absorbing alloys.

Even when the initial pH of the acid solution was changed as described above, the value of A/B was hardly changed, that is, the value in the embodiment 40 was approximately the same as that in the embodiment 37, the value in the embodiment 41 was approximately the same as that in the embodiment 38, the value in the embodiment 42 was approximately the same as that in the embodiment 39, and the value in the comparative example 28 was approximately the same as that in the comparative example 27.

Hydrogen absorbing alloy electrodes were then respectively fabricated in the same manner as described in the embodiments 25 to 27 and the comparative examples 16 and 17 using the hydrogen absorbing alloys obtained in the above-mentioned manner.

The internal pressure in the early stages of each of the nickel-hydrogen secondary batteries thus fabricated was measured in the same manner as described above. The results thereof were shown in the following Table 16.

TABLE 16

| | Al(OH)$_3$ (% by weight) | internal pressure characteristics (min) pH | | | | | |
|---|---|---|---|---|---|---|---|
| | | 0.5 | 0.7 | 1.0 | 1.5 | 2.0 | 3.0 |
| embodiment 40 | 1 | 95 | 135 | 135 | 140 | 135 | 95 |
| embodiment 41 | 3 | 100 | 140 | 140 | 140 | 140 | 100 |
| embodiment 42 | 5 | 100 | 145 | 145 | 145 | 135 | 95 |
| comparative example 28 | 7 | 95 | 120 | 125 | 125 | 110 | 90 |

As apparent from the results, when the initial pH of the acid solution was changed, the charging time period indicating the internal pressure characteristics of the battery in each of the embodiments 40 to 42 in which the value of A/B was not less than 1.20 was longer than that in the comparative example 28 in which the value of A/B was less than 1.20. Therefore, the emission of hydrogen gas in the early stages was restrained, so that a sufficient discharge capacity was obtained from the early stages.

In surface-treating the hydrogen absorbing alloy in the acid solution as described above, when the hydrogen absorbing alloy was treated in the acid solution whose initial pH was in the range of 0.7 to 2.0, the internal pressure characteristics of each of the nickel-hydrogen secondary batteries were further improved.

(Embodiments 43 to 45 and Comparative Example 29)

In the embodiments 43 to 45 and the comparative example 29, in surface-treating in an acid solution hydrogen absorbing alloys, the initial pH of the acid solution was set to 1.0, and 50 ppm of anthraquinone was added to the acid solution as in the embodiments 37 to 39 and the comparative example 27, and the amount of Al(OH)$_3$ added to the acid solution in the embodiment 43 was made the same as that in the embodiment 37, the amount in the embodiment 44 was made the same as that in the embodiment 28, the amount in the embodiment 45 was made the same as that in the embodiment 29, and the amount in the comparative example 29 was made the same as that in the comparative example 27 as shown in the following Table 17, while the liquid temperature of the acid solution was changed as shown in the same table, to respectively surface-treat the hydrogen absorbing alloys.

Even when the liquid temperature of the acid solution was changed as described above, the value of A/B was hardly changed, that is, the value in the embodiment 43 was approximately the same as that in the embodiment 37, the value in the embodiment 44 was approximately the same as that in the embodiment 38, the value in the embodiment 45 was approximately the same as that in the embodiment 39, and the value in the comparative example 29 was approximately the same as that in the comparative example 27.

Hydrogen absorbing alloy electrodes were then respectively fabricated in the same manner as described in the embodiments 25 to 27 and the comparative examples 16 and 17 using the hydrogen absorbing alloys obtained in the above-mentioned manner.

The internal pressure in the early stages of each of the nickel-hydrogen secondary batteries thus fabricated was measured in the same manner as described above. The results thereof were shown in the following Table 17.

TABLE 17

| | Al(OH)$_3$ (% by weight) | internal pressure characteristics (min) liquid temperature of acid solution (° C.) | | | | | |
|---|---|---|---|---|---|---|---|
| | | 10.0 | 25.0 | 40.0 | 60.0 | 70.0 | 80.0 |
| embodiment 43 | 1 | 120 | 135 | 145 | 145 | 140 | 95 |
| embodiment 44 | 3 | 120 | 140 | 145 | 145 | 140 | 95 |
| embodiment 45 | 5 | 120 | 145 | 145 | 145 | 145 | 95 |
| comparative example 29 | 7 | 120 | 125 | 125 | 130 | 115 | 95 |

As apparent from the results, when the liquid temperature of the acid solution was set in the range of 25.0° C. to 70.0° C., the charging time period indicating the internal pressure characteristics of the battery in each of the embodiments 43 to 45 in which the value of A/B was not less than 1.20 as described above was longer than that in the comparative example 29 in which the value of A/B was less than 1.20. Therefore, the emission of hydrogen gas in the early stages was restrained, so that a sufficient discharge capacity was obtained from the early stages.

(Embodiments 46 to 48 and Comparative Example 30)

In the embodiments 46 to 48 and the comparative example 30, in surface-treating in an acid solution hydrogen absorbing alloys, the initial pH of the acid solution was set to 1.0, the liquid temperature thereof was set to 25° C. as in the embodiments 37 to 39 and the comparative example 27, and the amount of aluminum hydroxide Al(OH)$_3$ added to the acid solution in the embodiment 46 was made the same as that in the embodiment 37, the amount in the embodiment 47 was made the same as that in the embodiment 38, the amount in the embodiment 49 was made the same as that in the embodiment 39, and the amount in the comparative example 30 was made the same as that in the comparative example 27 as shown in the following Table 18, while the amount of anthraquinone added to the acid solution was changed as shown in the same table, to respectively surface-treat the hydrogen absorbing alloys.

Even when the amount of anthraquinone added to the acid solution was changed as described above, the value of A/B was hardly changed, that is, the value in the embodiment 46 was approximately the same as that in the embodiment 37, the value in the embodiment 47 was approximately the same as that in the embodiment 38, the value in the embodiment 48 was approximately the same as that in the embodiment 39, and the value in the comparative example 30 was approximately the same as that in the comparative example 27.

Hydrogen absorbing alloy electrodes were then respectively fabricated in the same manner as described in the embodiments 25 to 27 and the comparative examples 16 and 17 using the hydrogen absorbing alloys obtained in the above-mentioned manner.

The internal pressure in the early stages of each of the nickel-hydrogen secondary batteries thus fabricated was measured in the same manner as described above. The results thereof were shown in the following Table 18.

TABLE 18

| | Al(OH)$_3$ (% by weight) | internal pressure characteristics (min) amount of added anthraquinone (ppm) | | | | | |
|---|---|---|---|---|---|---|---|
| | | 0 | 5 | 10 | 50 | 100 | 200 |
| embodiment 46 | 1 | 125 | 140 | 140 | 135 | 135 | 95 |
| embodiment 47 | 3 | 125 | 145 | 145 | 140 | 140 | 95 |
| embodiment 48 | 5 | 130 | 145 | 145 | 145 | 145 | 95 |
| comparative example 30 | 7 | 125 | 130 | 130 | 125 | 125 | 95 |

As apparent from the results, when the amount of anthraquinone added to the acid solution was in the range of 5 ppm to 100 ppm, the charging time period indicating the internal pressure characteristics of the battery in each of the embodiments 46 to 48 in which the value of A/B was not less than 1.20 as described above was longer than that in the comparative example 30 in which the value of A/B was less than 1.20. Therefore, the emission of hydrogen gas in the early stages was restrained, so that a sufficient discharge capacity was obtained from the early stages.

Although the present invention has been fully described by way of examples, it is to be noted that various changes and modification will be apparent to those skilled in the art.

Therefore, unless otherwise such changes and modifications depart from the scope of the present invention, they should be construed as being included therein.

What is claimed is:

1. A hydrogen absorbing alloy electrode using a hydrogen absorbing alloy containing at least nickel, cobalt and aluminum, wherein letting a be the sum of the respective abundance ratios of cobalt atoms and aluminum atoms in a portion to a depth of 30 Å from the surface of the hydrogen absorbing alloy, and b be the sum of the respective abundance ratios of cobalt atoms and aluminum atoms in a bulk region inside the hydrogen absorbing alloy, conditions of a/b≧1.30 are satisfied.

2. A hydrogen absorbing alloy electrode using a hydrogen absorbing alloy containing at least nickel, cobalt, aluminum and manganese, wherein letting A be the sum of the respective abundance ratios of cobalt atoms, aluminum atoms and manganese atoms in a portion to a depth of 30 Å from the surface of the hydrogen absorbing alloy, and B be the sum of the respective abundance ratios of cobalt atoms, aluminum atoms and manganese atoms in a bulk region inside the hydrogen absorbing alloy, conditions of A/B≧1.20 are satisfied.

3. An alkali secondary battery using a hydrogen absorbing alloy electrode containing a hydrogen absorbing alloy as its negative electrode, wherein said hydrogen absorbing alloy contains at least nickel, cobalt and aluminum, and letting a be the sum of the respective abundance ratios of cobalt atoms and aluminum atoms in a portion to a depth of 30 Å from the surface of the hydrogen absorbing alloy, and b be the sum of the respective abundance ratios of cobalt atoms and aluminum atoms in a bulk region inside the hydrogen absorbing alloy, conditions of a/b≧1.30 are satisfied.

4. An alkali secondary battery using a hydrogen absorbing alloy electrode containing a hydrogen absorbing alloy at its negative electrode, wherein said hydrogen absorbing alloy contains at least nickel, cobalt, aluminum and manganese, and letting A be the sum of the respective abundance ratios of cobalt atoms, aluminum atoms and manganese atoms in a portion to a depth of 30 Å from the surface of the hydrogen absorbing alloy, and B be the sum of the respective abundance ratios of cobalt atoms, aluminum atoms and manganese atoms in a bulk region inside the hydrogen absorbing alloy, conditions of A/B≧1.20 are satisfied.

* * * * *